United States Patent
Junge et al.

(10) Patent No.: US 8,504,115 B2
(45) Date of Patent: *Aug. 6, 2013

(54) AUTOMATIC SIDETONE CONTROL

(75) Inventors: Terry A. Junge, Scotts Valley, CA (US); Richard T. Brockway, Felton, CA (US)

(73) Assignee: Plantronics, Inc., Santa Cruz, CA (US)

( * ) Notice: Subject to any disclaimer, the term of this patent is extended or adjusted under 35 U.S.C. 154(b) by 1260 days.

This patent is subject to a terminal disclaimer.

(21) Appl. No.: 12/276,020

(22) Filed: Nov. 21, 2008

(65) Prior Publication Data

US 2010/0130247 A1    May 27, 2010

(51) Int. Cl.
*H04M 15/00* (2006.01)
*H04M 3/00* (2006.01)
*H04M 5/00* (2006.01)

(52) U.S. Cl.
USPC ............. 455/569.1; 379/100.15; 379/387.01; 379/428.01; 379/428.02

(58) Field of Classification Search
USPC ............. 379/100.15, 387.01, 428.01, 428.02
See application file for complete search history.

(56) References Cited

U.S. PATENT DOCUMENTS

| | | | | |
|---|---|---|---|---|
| 4,500,755 A | * | 2/1985 | Murto | 379/402 |
| 5,398,282 A | * | 3/1995 | Forrester et al. | 379/391 |
| 5,692,042 A | * | 11/1997 | Sacca | 379/390.01 |
| 6,801,623 B1 | * | 10/2004 | Carter | 379/391 |
| 6,993,125 B2 | * | 1/2006 | Michaelis | 379/391 |
| 7,010,332 B1 | * | 3/2006 | Irvin et al. | 455/575.2 |
| 7,162,016 B1 | * | 1/2007 | Schmidt et al. | 379/100.15 |
| 7,330,739 B2 | * | 2/2008 | Somayajula | 455/570 |
| 7,467,315 B2 | * | 12/2008 | Chang | 713/323 |
| 7,720,455 B2 | * | 5/2010 | Anderton | 455/267 |
| 7,881,927 B1 | * | 2/2011 | Reuss | 704/226 |
| 8,014,842 B2 | * | 9/2011 | Kuga et al. | 455/575.4 |
| 8,050,398 B1 | * | 11/2011 | Xu | 379/392 |
| 8,270,160 B2 | * | 9/2012 | Liang | 361/679.56 |
| 2002/0097866 A1 | * | 7/2002 | Michaelis | 379/433.04 |
| 2004/0174989 A1 | * | 9/2004 | Michaelis | 379/391 |
| 2004/0242160 A1 | * | 12/2004 | Ichikawa et al. | 455/67.13 |
| 2005/0107137 A1 | * | 5/2005 | Byun et al. | 455/575.1 |
| 2005/0221874 A1 | * | 10/2005 | Cho et al. | 455/575.4 |
| 2008/0039162 A1 | * | 2/2008 | Anderton | 455/702 |
| 2009/0256674 A1 | * | 10/2009 | Lee et al. | 340/5.6 |
| 2010/0020940 A1 | * | 1/2010 | Zad-Issa et al. | 379/32.01 |
| 2010/0069114 A1 | * | 3/2010 | Lee et al. | 455/556.1 |

* cited by examiner

Primary Examiner — Bobbak Safaipour (57) ABSTRACT

An automatic sidetone controller for a digital telecom device, such as a headset or head-set adapter having a transmit (TX) channel, a receive (RX) channel, and circuitry for generating a sidetone signal by coupling a portion of a signal on the TX channel onto the RX channel via a sidetone path, is operable to detect when the TX channel of the device is active and inactive and to respectively activate and deactivate the sidetone path in response thereto without need for manual intervention by the user.

30 Claims, 5 Drawing Sheets

|   | Use Case | Sidetone State |
|---|---|---|
| 1 | TX Digital Audio Channel OPEN | ON |
| 2 | TX Digital Audio Channel CLOSED | OFF |

AUTOMATIC SIDETONE CONTROL

BRIEF DESCRIPTION OF THE INVENTION

This invention relates to telecommunications (telecom) in general, and more particularly, to methods and apparatus for automatically enabling and disabling sidetone in telecom headsets and headset adapters.

BACKGROUND

In full duplex telephony, "sidetone" comprises a form of intentional feedback to the user of a telecom device, such as a telephone handset or headset, that enables the user to hear his own voice and thereby ascertain that a connection, or communication circuit, is open between the user and a far-end respondent, and also as a means for modulating the volume and speech formatives of the user's voice for effective communication. When the user speaks, his voice is sensed by the microphone of the device and introduced (at a reduced level) into the earpiece of the device so that the user hears himself speaking. Without sidetone, users cannot hear their own voice in the earpiece, and may conclude that the device is not working, or may speak either too softly or too loudly for effective communication.

Digital telecom devices typically lack the mechanical acoustics and circuitry that are pre-sent in older analog telephones for creating sidetone and therefore typically include electronic circuitry that generates the sidetone. An example of such a sidetone generator can be found in, e.g., U.S. Pat. No. 7,330,739 to S. Somayajula.

In voice-over-internet-protocol (VOIP) telephony, headsets coupled via, e.g., a universal serial bus (USB) connection to a host computer, typically a personal computer (PC) acting as a telephone host, constitute the telecom devices of choice. Special USB adapters are also available that can be used to couple conventional corded analog telecom headsets to a suitably programmed PC telephone host. These headsets and adapters are typically marketed as both VOIP and hi-fidelity computer audio devices, i.e., as "multifunction" devices that can be used for both telephony and pure listening activities, such as the audition of music, e.g., MP3 files.

By default, these devices have sidetone turned on at all times. This does not present a problem if the user of the headset is engaged exclusively in VOIP telephonic activities, where, as above, sidetone is a desirable feature. However, if the user is listening to music or simply sitting idly, the user may not want to have background noise or his own voice injected into the headset earpiece(s). If the user does not want sidetone on, the sidetone of the device must be turned off manually. This requires the user to open the audio mixer console of the PC's operating system (OS), e.g., Windows, and manually turn the sidetone off. Then, when sidetone in the device is wanted again, the user must turn it back on manually, again using the OS mixer console. This process of navigating the OS mixer is time consuming and not intuitive to technically unsophisticated users, and can result in missed calls and degraded listening experiences.

SUMMARY

In accordance with the present disclosure, an automatic sidetone control feature of a telecom device, such as a headset or headset adapter that is coupled to a telephone host device, such as a PC or a digital phone, is operable to sense when the transmit (TX) channel between the two devices is active and to automatically turn the sidetone feature of the device on, and additionally, to automatically turn off sidetone in the device when the TX channel is not active.

In one example embodiment, an automatic sidetone controller for a telecom device having a TX channel, a receive (RX) channel, a signal processor and circuitry for generating a sidetone signal by coupling a portion of a signal transmitted on the TX channel onto the RX channel via a sidetone path comprises logic encoded for execution in the signal processor and operable when executed to detect when the TX channel of the device has been placed in an active mode and to enable the sidetone path in response thereto, and to detect when the TX channel of the device has been placed in an inactive mode and to disable the sidetone path in response thereto.

A better understanding of the above and many other features and advantages of the novel sidetone control feature of the present disclosure may be obtained from a consideration of the detailed description of some example embodiments thereof below, particularly if such consideration is made in conjunction with the several views of the appended drawings, wherein like elements are referred to by like reference numerals throughout.

DETAILED DESCRIPTION

In accordance with an embodiment of the present disclosure, an automatic sidetone control feature of a telecom device, such as a digital headset or an analog headset adapter coupled to a digital telephone host device, such as a PC or a digital telephone, is operable to detect when the TX channel between the two devices is either active or inactive and to automatically turn the sidetone of the telecom device on and off, respectively, in response thereto without need for manual intervention by the user.

Figure 1:
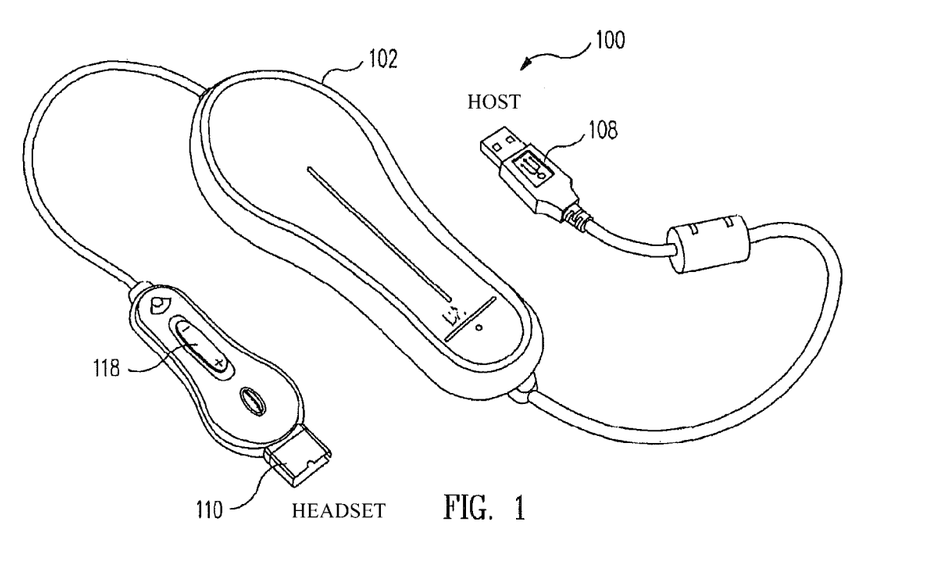
FIG. 1 is a perspective view of an example embodiment of an adapter for coupling an analog telecommunications headset to a host device in accordance with the present disclosure.
Figure 2:
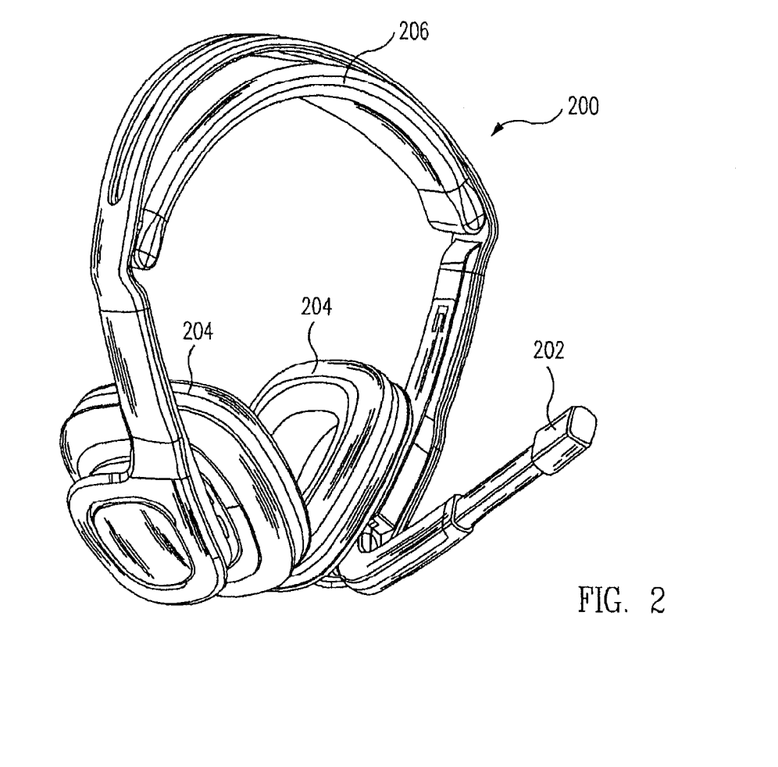
FIG. 2 is a perspective view of an example embodiment of a telecom headset that may be used for both telecommunication and listening-only activities.
Figure 3:
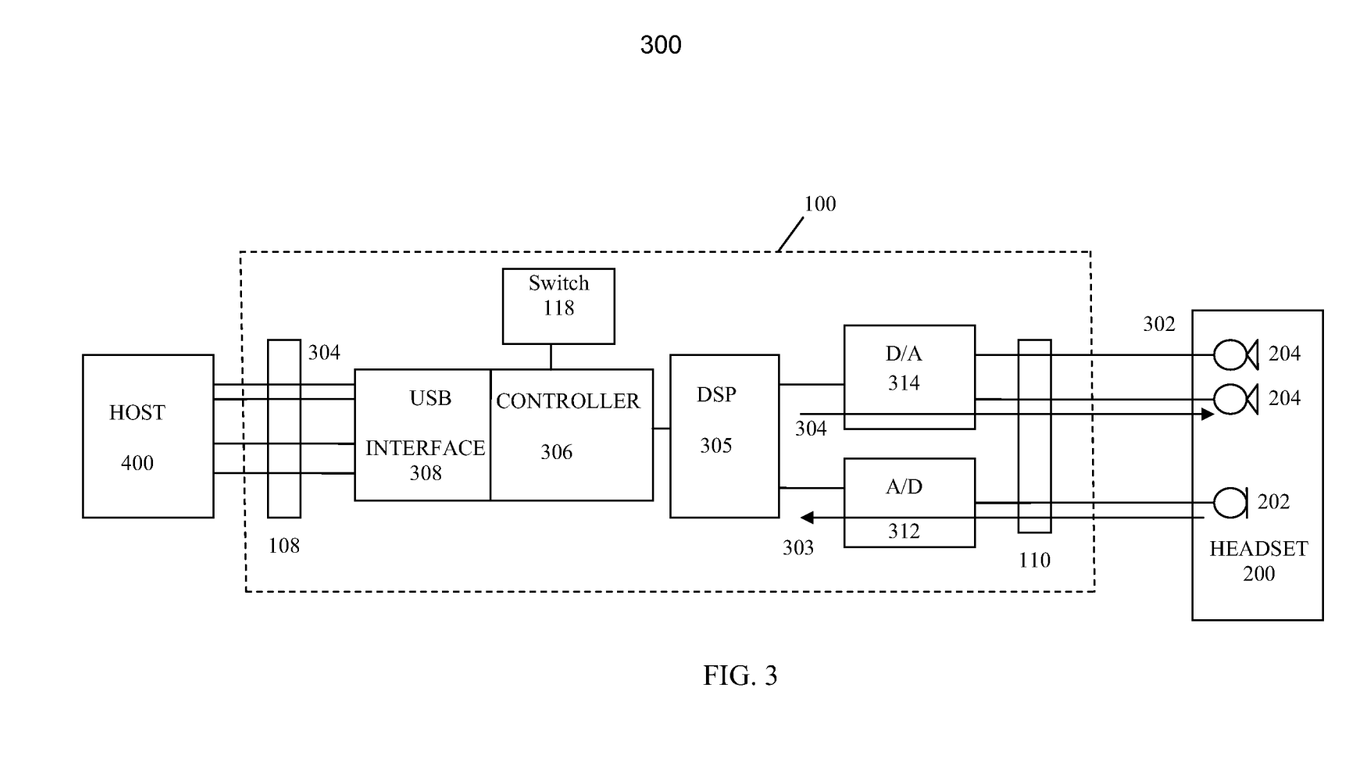
FIG. 3 is a hardware block diagram of an adapter for coupling an analog telecommunications headset to a host device in accordance with the present disclosure.

FIG. 1 is a perspective view of an example embodiment of one type of telecom device, viz., an adapter 100 for coupling a conventional analog telecom headset to a host digital computer or digital telephone (not illustrated) in accordance with the present disclosure. FIG. 2 is a perspective view of an example embodiment of an another type of telecom device, viz. a headset 200 that, in the case of a digital headset, may be directly coupled to a host digital computer or digital telephone (not illustrated), and in the case of a conventional analog headset, may be coupled thereto through the adapter 100 of FIG. 1, and in either case, used for both bidirectional telephony and listening-only activities. FIG. 3 is a hardware block diagram of a telecommunication system 300 incorporating an example embodiment of an automatic sidetone generator and control apparatus in accordance with the present disclosure.

With reference to FIGS. 1 and 2 the headset adapter 100 includes a main body 102 housing circuitry which is adapted to, inter alia, couple an analog headset 200, such as the example headset of FIG. 2, to a host computer or digital telephone or other host device 400, as described in more detail below. As illustrated in FIG. 2, the analog headset 200 comprises a microphone 202, at least one audio speaker or earpiece 204 (also referred to as a receiver), and an apparatus 206, such as the resilient headband illustrated, for holding the headset on a user's head such that the microphone 202 is disposed adjacent to the user's mouth and at least one earpiece is disposed adjacent to one of the user's ears. Other known types of headset holding mechanisms, such as ear loops and neck bands, can also be used. Referring to FIG. 3, the microphone 202 comprises a transducer, such as a dynamic, electret or piezoelectric transducer, that is operable to detect acoustic signals, such as the sounds of a user's voice, to convert the acoustic signals to corresponding electrical signals, and to couple the electrical signals onto a TX channel 303 for ultimate transmission to a far-end respondent. The earpiece transducer 204 is operable to receive electrical signals via an RX channel 304, to convert the electrical signals to corresponding audible acoustic signals, and to output the acoustic signals to one of the user's ears.

The adapter body 102 may contain a printed circuit board (not illustrated) on which one or more active circuit devices, such as integrated circuits (ICs) and one or more digital signal processors (DSPs) 305 are mounted and interconnected. In one advantageous embodiment, substantially all of the active circuitry may be embodied in a single, dedicated signal processing chip. The adapter firmware of DSP 305 controls circuitry for generating and controlling a sidetone signal in the headset 200, which, as discussed above, can be implemented in a variety of known ways, by coupling at least a portion of a TX signal from the microphone 202 to speaker(s) 204.

As those of skill in the art will appreciate, the particular example adapter 100 and associated analog headset 200 illustrated in FIG. 2 can comprise a monophonic system, or the adapter 100 and headset 200 may easily be augmented with a second RX channel 304 and earpiece 204, as illustrated in FIG. 2 and 3, to form a binaural or stereophonic system. In a stereophonic system, each of two RX channels and earpieces are respectively dedicated to the right and left channels of the system. Although conventional VOIP telephony is universally monophonic in nature, the addition of a second channel to the system enables the headset 200 to function not only as a telecom device, but also as a means for delivering high fidelity stereophonic sound to a user.

With reference to FIG. 3, since the microphone 202 and earpiece transducers 204 of the headset 200 are typically analog in nature, the communication path 302 between the headset 200 and the adapter 100 is also typically analog in nature. Further, since the host device 400 is inherently digital in nature, the communication path 304 between the host device 400 and the adapter 100 is also digital in nature, and accordingly, the adapter circuitry further includes circuitry for converting a digital RX signal from the digital host device 400 to an analog RX signal for output to the analog speakers or earpiece(s) 204 of the headset 200, as well as circuitry for converting an analog TX signal from the microphone 202 of the headset 200 to a digital TX signal and outputting it to the host device 400. This signal converting circuitry may respectively include suitable digital-to-analog (D/A) 314 and analog-to-digital (A/D) converters 312 and/or audio coder-decoders (codecs) of a known type, and additionally, may be either off-the-shelf, standalone devices, or alternatively, may be integrated into a single DSP device in the adapter, such as a commercially available from Micronas, UAC 3556B.

The example headset adapter 100 further includes a connector 108 for coupling the adapter to the host device 400 via a digital communication protocol, as well as one or more connectors 110 for attaching the headset 200, such that the headset is coupled to the host device 400 through the adapter 100. In the particular example embodiment of FIGS. 1 and 3, the adapter 100 communicates with the host device 400 via the universal serial bus (USB) protocol at USB interface 308 and controller 306, and accordingly, the host connector 108 in this illustrative embodiment comprises a conventional USB connector.

However, it should be understood that the particular data communication protocol by which the adapter 100 communicates with the host device 400 is not limited to the USB protocol, and the adapter may instead communicate with the host device 400 by means of another digital communication protocol, such as pulse code modulation (PCM), Microsoft AC '97, IEEE 1394 (Firewire), AES/EBU (AES3), S/PDIF, MADI (AES10), Intel High Definition Audio (HD Audio), mLan, mp3, and WAV protocols, or another digital protocol, and accordingly, the connector 108 may comprise a correspondingly appropriate alternative connector type. The plug(s) (not illustrated) of the analog headset 200 may be comprised, of one or more conventional analog plugs, e.g. ⅛ inch analog plugs, including one each for the microphone 202 and the speaker(s) or earpiece(s) 204 thereof. Alternatively, the headset may incorporate a single, integrated plug through which the TX and RX signals 303, 304 are coupled into/from the headset 200. Still further, one or both of the links between the adapter 100 and the host device 400 and the headset 200 may be a wireless link, and the adapter 100 may be integrated with the host device 400 or the headset 200.

Figure 4:
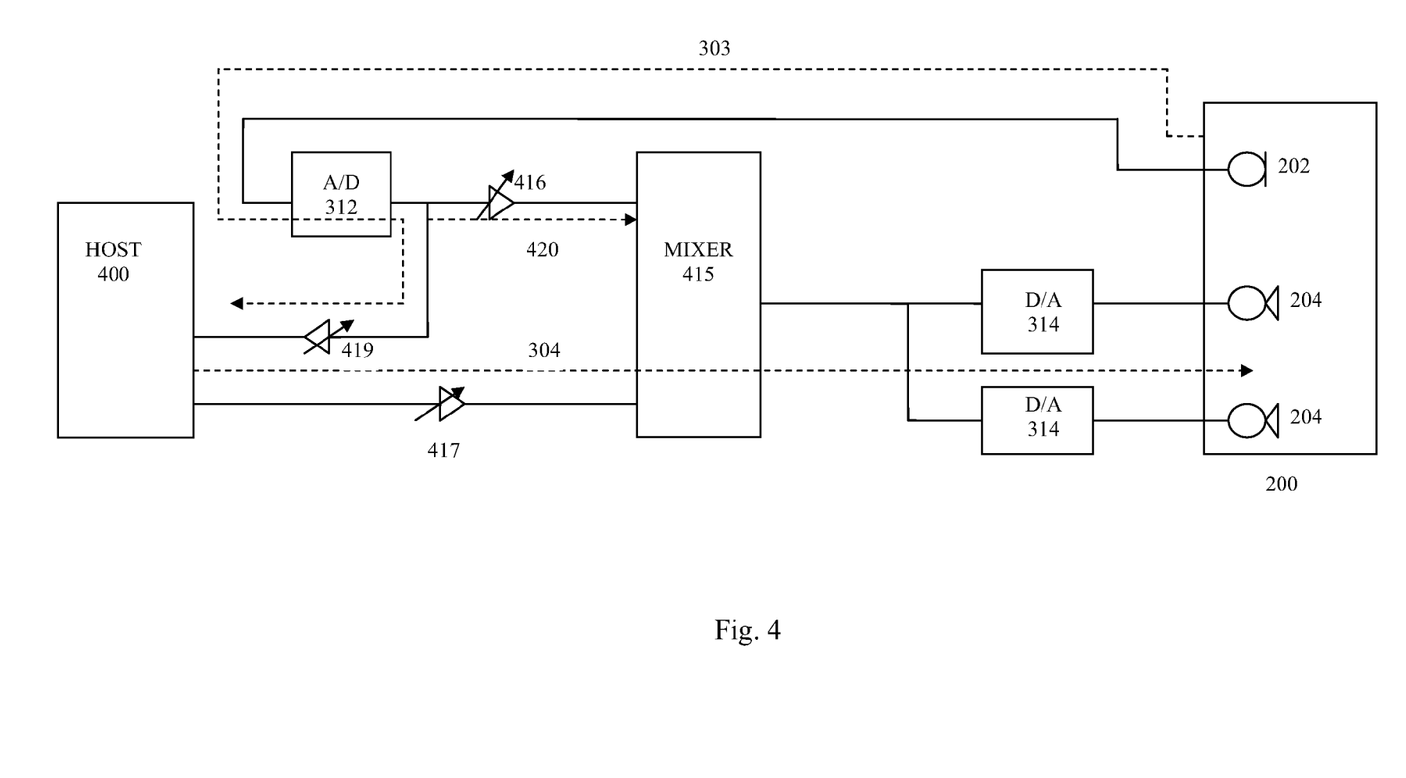
FIG. 4 is a diagram of the DSP firmware signal flow in an adapter for coupling an analog telecommunications headset to a host device in accordance with the present disclosure.

Referring now to FIG. 4, illustrated is the signal flow of a particular USB embodiment of the invention. In the USB communication protocol, all data transmissions travel to or from a device "endpoint" via a software "pipe" established between the device and the host at the time of system power-up ("enumeration") or when the device is later connected to the host. Endpoint 0, for example, is a default bidirectional control point, always accessible. (Industry standard USB Specification 2.0 describes the bus attributes, protocol definitions, types of transactions and programming interface for USB devices. USB Device Class Definition for Audio Devices 1.0 defines USB audio transport mechanisms. Both specifications are included in this disclosure by reference as if explicitly set forth.) Other endpoints are uniquely identifiable portions of a USB device that are the terminus of communication flow between the host and device.

Following the TX path signal flow 303, an audio signal from microphone 202 of the headset 200 is converted to a digital stream by A/D 312 and the signal is directed to digital TX amplifier 419. Amplifier 419 can be used as a volume control for the TX signal path. Output from amplifier 419 is provided to the USB interface 308. This function is defined as "endpoint 1". Thus "Endpoint 1" is allocated to the TX function addressable by the host device 400 to initiate the transfer of audio data from the headset 200 to the host device 400 under the host's control. "Endpoint 1" is the terminus of the TX communication with host device 400. To effect an audio TX path from the headset 200 to the host, the host requests a change for "endpoint 1" and its "pipe" from "alternate 0" (closed channel with zero bandwidth assigned) to "alternate 1" (open channel of appropriate bandwidth on the bus). That is, "endpoint 1" is toggled from a "0" or "inactive" mode to a "1" or "active" mode. In the "inactive mode", the headset 200 is incapable of transmitting audio data to the host device 400, and in the "active mode", transmits packets of audio data to the host device 400 isochronously and without error correction under the control of the host device 400.

Referring again to FIG. 4, the host device 400 provides a digital RX signal 304 at the USB interface 308 defined as "endpoint 2". This data stream of digital signal 304 can carry monaural or stereo audio information. The data is input to RX amplifier 417, which can be configured as a volume control that allows a user to set RX level via controller 306. Data flows from amplifier 417 to digital mixer 415. Mixer 415 then provides RX signal 304 to D/A(s) 314 which in turn drive speaker(s) 204. "Endpoint 2" is the terminus of the RX signal from the host device 400 to the adapter 100 addressable by the host device 400 to initiate the transfer of audio data from the host device 400 to the speaker(s) 204 under the host's control.

When "endpoint 1" and its "pipe" are open, analog signals from microphone 202 of headset 200, after conversion to a digital stream by A/D converter 312, also flow to digital amplifier 416. Amplifier 416 provides a level control of the digital TX signal 303 input to mixer 415 under the command of controller 306. Amplifier 416 can adjust the feedback level of TX signal 303 from zero (no sidetone) to a nominal value representing a desired sidetone level. Mixer 415 then mixes the desired TX signal with the RX signal 304 from digital amplifier 417.

In accordance with this embodiment of the invention, controller 306 is programmed to monitor the status of the TX channel. If the TX channel is in an open condition ("endpoint 1" in active mode), amplifier 416 is set to nominal gain by the controller 306 and a desired level of the TX signal 303 is mixed with the RX 304 signal in mixer 415. This combined signal is sent through D/A 314 to the speakers 204 and the headset wearer hears sidetone. When the TX channel is closed by the host device 400 ("endpoint 1" in inactive mode), amplifier 416 is set to 0 gain level by controller 306 and mixer 415 has no TX signal input. Only the RX signal 304 from the host device 400 is present at the output of mixer 415 and the headset wearer will hear no sidetone. Thus, headset adapter 100 provides an automatic sidetone control function, which in this embodiment, comprises logic and circuitry for detecting when the TX channel 303 of the adapter has been placed in an "open" or active mode by the host device 400 and for enabling the sidetone path 420 between the TX and Receive channels 303 and 304 in response thereto, as well as logic and circuitry for detecting when the TX channel 303 from the headset has been placed in the inactive mode and for disabling the sidetone path in response thereto. In the example USB adapter of FIG. 4, this function is affected by logic (firmware) incorporated in the programming of the adapter's controller 306.

Figure 5:
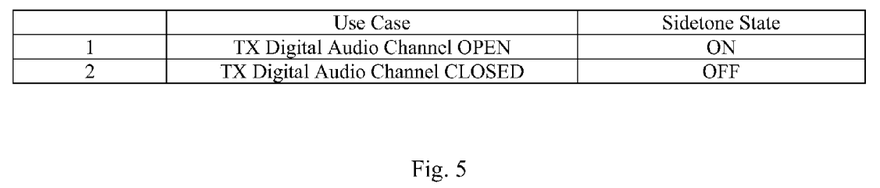
FIG. 5 is a table illustrating a user configurable state of a telecom device incorporating the example sidetone control apparatus; and, FIG. 6 is a logic flow diagram of an example embodiment of a method for automatically controlling sidetone in a telecommunication headset in accordance with the present disclosure.

FIG. 5 is a logic table used in the sidetone generating and path controller portion 306 of the circuitry of the adapter 100 to detect a change in the alternate mode of the TX endpoint of the system and to automatically enable or disable the sidetone path 420 in response thereto. As shown seen in FIG. 6, the example method 500 may comprise a subroutine executed within a main processing loop 502 of the adapter 100's processor during operation.

Figure 6:
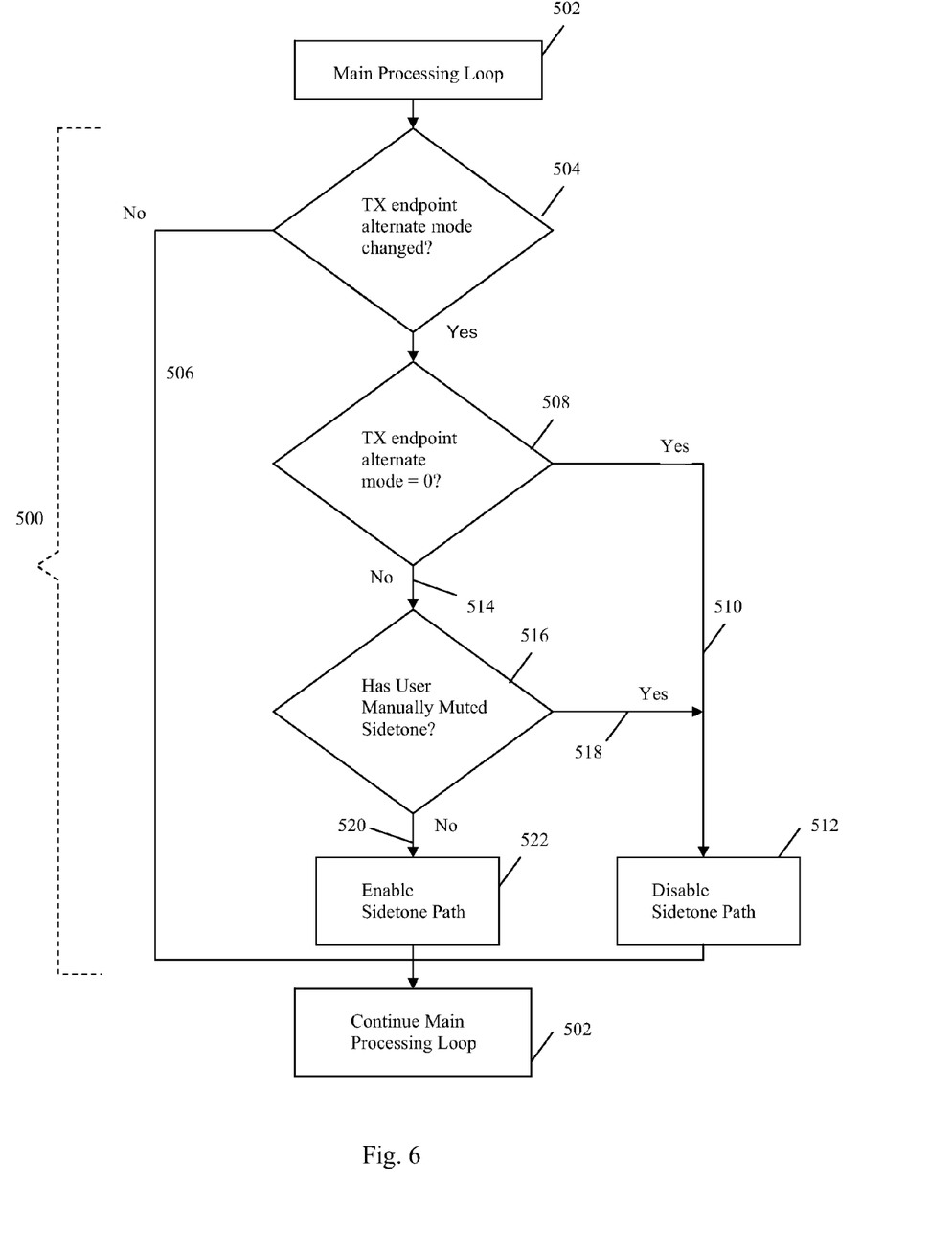

Thus, in step 504 of the sidetone controller method 500 of FIG. 6, the processor of the adapter 100 or headset 200 checks to determine whether the endpoint 1 alternate mode has changed, i.e., from a 0 to a 1 or vice versa, since the last processor cycle. If it determines that no change has occurred, i.e., a "No" determination, the balance of the subroutine is bypassed via the branch 506 and the processor proceeds with the main processing loop 502. However, if the endpoint alternate mode has changed, i.e., a "Yes" determination, then at step 508, the processor determines whether the TX endpoint mode has been changed to 0, i.e., the disabled mode. If a Yes determination is made, the method proceeds via branch 510 to step 512, at which the processor disables the sidetone path 420, so that no sidetone is coupled onto the RX channel 304, and hence, no sidetone is heard by the user, whereupon the processor continues with the main processing loop 502, as above.

On the other hand, if a "No" determination is made at step 508, then the method 500 proceeds via branch 514 to step 516, where a determination is made as to whether the user has manually muted sidetone, e.g., through a telephony or listening application program running on the host device 400, or by manually actuating a sidetone muting switch 118 on the headset adapter 100 or a sidetone muting switch on the headset. If a "Yes" determination is made at step 516, the method proceeds via branch 518 to step 512, where, as above, the processor disables the sidetone path 420, and then continues with the main processing loop 502. However, if a "No" determination is made at step 516, i.e., the user has not manually muted sidetone, then the method proceeds via branch 520 to step 522, at which the processor enables the sidetone path 420, so that sidetone from the microphone 202 is coupled onto the RX channel 304, and hence, is heard by the user through the earpiece 204 of the headset 200, then continues on with the main processing loop 502.

As may be seen from the foregoing, the TX channel 303 is defined as "active" or "open" when the host device 400 requests audio data from the microphone 202. This occurs, for example, when a VOIP phone call is either initiated or received by the user. When the host device 400 wants microphone audio data, it sends a control transfer instruction to the adapter 100 via the digital audio communication path 304 that tells the adapter 100 to supply the microphone audio. When the processor of the adapter 100 receives this command, it begins supplying microphone audio data to the host device 400 via the USB interface 308, and at the same time, controller 306 enables the sidetone path 420. At all other times, the controller disables the sidetone path. These two states are illustrated in the sidetone control logic table of FIG. 5.

An example use case of the automatic sidetone controller is one in which a user is initially listening to music on a host device 400 (e.g. a personal computer) with an analog telecom headset 200 coupled to the host device 400 via a USB headset adapter 100 equipped with the novel automatic sidetone controller. In such a case, no distracting sidetone is present in the headset, because the TX channel 303 of the system is inactive. The user may then receive a VOIP phone call via, e.g., the Skype service. The user may then quickly switch to the call, causing the TX channel 303 of the adapter 100 to become active. As above, the sidetone controller 306 portion of the adapter's processor immediately detects this change in mode, and in response, automatically enables the sidetone path 420 of the adapter 100, as above. After the user completes the call, i.e., "hangs up," the TX 303 channel becomes inactive, i.e., in the USB example, the "endpoint 1" alternate mode is set to 0, or inactive. The sidetone controller detects this change, and automatically disables the sidetone path 420, so that the user may resume listening to the music without having to access the audio mixer function of the host device 400.

As described above, for additional functionality, the adapter 100 may include a mechanism, such as a switch 118 (FIG. 3), manually operable by the user for selectively activating and deactivating the automatic sidetone generator via the controller 306. When active, the sidetone generator and controller 306's operation is as described above and illustrated in FIG. 5. However, when sidetone is muted by the user, i.e., when the sidetone generator is manually deactivated by the user, its operation reverts to the default operation described above, in which sidetone is manually activated or deactivated by the user through the audio mixer function of the host device 400.

The primary advantages of the automatic sidetone generator and controller 306 is that sidetone is present only when the user wants it to be and that its presence or absence is invoked automatically, without the need for manual intervention by the user.

As those of skill in the art will appreciate, although the methods and apparatus of the present disclosure have been described and illustrated herein with reference to certain specific example embodiments thereof, a wide variety of modifications and variations may be made to them without departing from the spirit and scope of the invention. For example, it should be understood that the functionality of the adapter 100 described above, including the automatic sidetone generator and controller 306, may be incorporated directly into the headset 200, such that the adapter is eliminated and the resulting "digital" headset then comprises an integrated telecom device that connects directly to the host device 400 via, e.g., a USB or other digital type of connection. Another possible mode would couple the TX sidetone to the RX path at a point where both TX and RX signals are analog rather than digital. The controller 306 would detect the changes in TX mode in the same manner as fully described previously and then enable or disable an analog amplifier for the sidetone path.

In light of the foregoing, the scope of the present invention should not be limited to that of the specific example embodiments described and illustrated herein, but rather, should be commensurate with that of the claims appended hereafter and their functional equivalents.

What is claimed is:

1. An automatic sidetone controller for a telecom device having a transmit (TX) channel, a receive (RX) channel, and a signal processor for generating a sidetone signal by coupling a portion of a signal transmitted on the TX channel onto the RX channel via a sidetone path, the controller comprising:
   logic encoded in tangible media for execution in the signal processor and operable when executed to:
   while the RX channel is in an active mode, detect when the TX channel of the device has been placed in an active mode and to enable the sidetone path in response thereto; and,
   while the RX channel is in an active mode, detect when the TX channel of the device has been placed in an inactive mode and to disable the sidetone path in response thereto.

2. The sidetone controller of claim 1, wherein the telecom device comprises a headset or a headset adapter.

3. The sidetone controller of claim 1, wherein the telecom device further comprises digital circuitry adapted to couple the telecom device in full duplex communication with a host device via a digital communication protocol.

4. The sidetone controller of claim 3, wherein the digital communication protocol comprises one of the group consisting of the universal serial bus (USB), pulse code modulation (PCM), Microsoft AC '97, IEEE 1394 (Firewire), AES/EBU (AES3), S/PDIF, MADI (AES10), Intel High Definition Audio (HD Audio), mLan, mp3, and WAV protocols.

5. The sidetone controller of claim 3, wherein the host device comprises a digital computer or a digital telephone.

6. The sidetone controller of claim 1, wherein the telecom device comprises a headset, including:
   a microphone;
   at least one earpiece; and,
   an apparatus for holding the headset on a user's head such that the microphone is disposed adjacent to the user's mouth and the at least one earpiece is disposed adjacent to one of the user's ears.

7. The sidetone controller of claim 1, further comprising an apparatus operable by a user of the device for manually activating and deactivating the automatic sidetone controller.

8. An adapter for coupling a headset to a digital host device, the adapter comprising:
   a transmit (TX) channel;
   a receive (RX) channel;
   means for respectively coupling TX and RX channels of the headset to the TX and RX channels of the adapter;
   means for coupling the adapter in full duplex communication with a host device via a digital communication protocol, including means for generating a sidetone signal in the headset by coupling at least a portion of a signal transmitted on the TX channel onto the RX channel via a sidetone path; and,
   an automatic sidetone controller, comprising:
      means for detecting when the TX channel of the device has been placed in an active mode and for automatically enabling the sidetone path in response thereto while the RX channel is in an active mode; and,
      means for detecting when the TX channel of the device has been placed in an inactive mode and for automatically disabling the sidetone path in response thereto while the RX channel is in an active mode.

9. The headset adapter of claim 8, wherein the headset comprises an analog headset.

10. The headset adapter of claim 8, wherein the digital communication protocol comprises one of the group consisting of the universal serial bus (USB), pulse code modulation (PCM), Microsoft AC '97, IEEE 1394 (Firewire), AES/EBU (AES3), S/PDIF, MADI (AES10), Intel High Definition Audio (HD Audio), mLan, mp3, and WAV protocols.

11. The headset adapter of claim 8, wherein the headset comprises:
   a microphone operable to detect adjacent acoustic signals, convert the acoustic signals to corresponding electrical signals and couple the electrical signals onto the TX channel;
   at least one receiver operable to receive electrical signals from the RX channel, convert the electrical signals to corresponding audible acoustic signals and output the acoustic signals to a user's ear; and,
   means for holding the headset on the user's head such that the microphone is disposed adjacent to the user's mouth and the at least one receiver is disposed adjacent to the user's ear.

12. The headset adapter of claim 11, further comprising:
   means for converting a digital RX signal received from the host device to an analog RX signal and outputting it to the headset; and,
   means for converting an analog TX signal received from the headset to a digital TX signal and outputting it to the host device.

13. The headset adapter of claim 12, wherein the signal converting means comprises at least one of the group consisting of a digital to analog (D/A) converter, an analog to digital (A/D) converter and a coder-decoder (codec).

14. The headset adapter of claim 8, further comprising means manually operable by the user for selectively activating and deactivating the automatic sidetone controller.

15. A telephony system, comprising:
   a digital host device disposed in communication with the internet and operable to establish full duplex telecommunication between a user of the system and a far end respondent via a voice-over-internet protocol (VOIP); and,
   a telecom device coupled in full duplex communication with the host device via a digital communication protocol, the telecom device comprising:
      a transmit (TX) channel;
      a receive (RX) channel;
      a first signal converter for converting a digital RX signal received from the host device to an analog RX signal;
      a second signal converter for converting an analog TX signal received from the user to a digital TX signal;
      a digital signal processor (DSP) adapted to generate a sidetone signal by coupling a portion of a signal transmitted on the TX channel onto the RX channel via a sidetone path; and,
      an automatic sidetone controller, comprising logic encoded in tangible media for execution in the DSP and operable when executed to:
         while the RX channel is in an active mode, detect when the TX channel of the device has been placed in an active mode and to automatically enable the sidetone path in response thereto; and,
         while the RX channel is in an active mode, detect when the TX channel of the device has been placed in an inactive mode and to automatically disable the sidetone path in response thereto.

16. The telephony system of claim 15, wherein the host device comprises a digital computer or a digital telephone.

17. The telephony system of claim 15, wherein the telecom device comprises a headset or a headset adapter.

18. The telephony system of claim 15, wherein the telecom device comprises a headset adapter coupled to the host device and an analog headset coupled to the host device through the adapter.

19. The telephony system of claim 15, wherein the digital communication protocol comprises one of the group consisting of the universal serial bus (USB), pulse code modulation (PCM), Microsoft AC '97, IEEE 1394 (Firewire), AES/EBU (AES3), S/PDIF, MADI (AES10), Intel High Definition Audio (HD Audio), mLan, mp3, and WAV protocols.

20. The telephony system of claim 15, wherein at least one of the first and second signal converters comprises one of the group consisting of a digital to analog (D/A) converter, an analog to digital (A/D) converter and a coder-decoder (codec).

21. A method for controlling sidetone in a telecom device having a microphone coupled to a transmit (TX) channel, a receiver coupled to a receive (RX) channel, and circuitry for generating a sidetone signal by feeding at least a portion of a signal generated by the microphone and transmitted on the TX channel back onto the RX channel via a sidetone path, the method comprising:
   while the RX channel is in an active mode, detecting when the TX channel has been placed in an active mode and automatically enabling the sidetone path in response thereto; and,
   while the RX channel is in an active mode, detecting when the TX channel has been placed in an inactive mode and automatically disabling the sidetone path in response thereto.

22. The method of claim 21, further comprising determining whether a user of the device has manually muted the sidetone of the device, and if so, disabling the sidetone path.

23. A method of controlling sidetone in a full duplex telecom device having a transmit (TX) channel, receiver (RX) channel, and circuitry for generating a sidetone signal by feeding at least a portion of a signal on the TX channel back onto the RX channel comprising:
   while the RX channel is in an active mode, receiving or initiating a call and automatically enabling a sidetone path in response thereto; and
   while the RX channel is in an active mode, ending a call and automatically disabling the sidetone path in response thereto.

24. The method of claim 23, wherein audio data is delivered by the RX channel prior to receiving or initiating a call.

25. The method of claim 24, further comprising stopping the delivery of the audio data to the RX channel responsive to receiving or initiating a call.

26. The method of claim 25, further comprising resuming the delivery of the audio when a call has ended.

27. An automatic sidetone controller for a telecom device having a transmit (TX) channel, a receive (RX) channel, and a signal processor for generating a sidetone signal by coupling a portion of a signal transmitted on the TX channel onto the RX channel via a sidetone path, the controller comprising:
   logic encoded in tangible media for execution in the signal processor and operable when executed to:
      while the RX channel is in an active mode, detect when a call is received or initialized and automatically enable a sidetone path in response thereto; and
      while the RX channel is in an active mode, detect when a call is terminated and automatically disable a sidetone path in response thereto.

28. The controller of claim 27, wherein audio data is delivered by the RX channel prior to receiving or initiating a call.

29. The controller of claim 28, the logic further comprising stopping the delivery of the audio data to the RX channel responsive to receiving or initiating a call.

30. The controller of claim 29, the logic further comprising resuming the delivery of the audio when a call has ended.

* * * * *